United States Patent [19]

De Laforcade et al.

[11] Patent Number: 5,577,641
[45] Date of Patent: Nov. 26, 1996

[54] DISPENSING ASSEMBLY COMPRISING A CYLINDRICAL CONTAINER INCLUDING A PISTON

[75] Inventors: Vincent De Laforcade, Rambouillet; Frank Lacout, Athis-Mons, both of France

[73] Assignee: L'Oreal, Paris, France

[21] Appl. No.: 374,718

[22] PCT Filed: Jun. 1, 1994

[86] PCT No.: PCT/FR94/00639

§ 371 Date: Jan. 26, 1995

§ 102(e) Date: Jan. 26, 1995

[87] PCT Pub. No.: WO94/29190

PCT Pub. Date: Dec. 22, 1994

[30] Foreign Application Priority Data

Jun. 4, 1993 [FR] France .................. 93 06704

[51] Int. Cl.⁶ .......................................... B67D 5/42
[52] U.S. Cl. ............................ 222/386; 222/389
[58] Field of Search .................. 222/257, 259, 222/260, 386, 389, 387, 394, 321.7, 383.1, 327; 277/208, 212 C, 212 F; 92/240, 249

[56] References Cited

U.S. PATENT DOCUMENTS

| | | | |
|---|---|---|---|
| 2,310,917 | 2/1943 | Daly | 92/249 |
| 2,777,741 | 1/1957 | Vielmo | 92/240 |
| 2,815,994 | 12/1957 | Lippman et al. | 92/249 |
| 3,052,194 | 9/1962 | Gilmore | 92/249 |
| 3,282,469 | 11/1966 | Skonberg | 222/260 |
| 3,667,652 | 6/1972 | Morane et al. | 222/386 |
| 4,027,810 | 1/1977 | van Manen | 222/327 |
| 4,452,370 | 6/1984 | Langensiepen et al. | 222/386 |
| 4,645,098 | 2/1987 | Hoffman | 222/386 |
| 4,907,727 | 3/1990 | Ernst et al. | 222/386.5 |
| 4,928,577 | 5/1990 | Stoll | 277/208 |

FOREIGN PATENT DOCUMENTS

| | | | |
|---|---|---|---|
| 0001452 | 4/1979 | European Pat. Off. | |
| 0254258 | 1/1988 | European Pat. Off. | |
| 0426408 | 5/1991 | European Pat. Off. | |
| 495734 | 7/1992 | European Pat. Off. | 222/386 |
| 12000293 | 12/1959 | France . | |
| 81101 | 7/1934 | Sweden | 222/386 |
| 2192577 | 1/1988 | United Kingdom . | |
| 84/02278 | 6/1984 | WIPO . | |

Primary Examiner—Andres Kashnikow
Assistant Examiner—Philippe Derakshani
Attorney, Agent, or Firm—Staas & Halsey

[57] ABSTRACT

Dispensing assembly including a container and a dispensing member for dispensing a product contained in the container. The container is cylindrical and receives therein a piston having a body made of rigid material. The body has a cylindrical part carrying a seal made of elastic material. The seal is overmolded on the body of the piston and has a semi-toric portion. The elastic material and the rigid material are chemically compatible so that the seal and piston bond together.

11 Claims, 3 Drawing Sheets

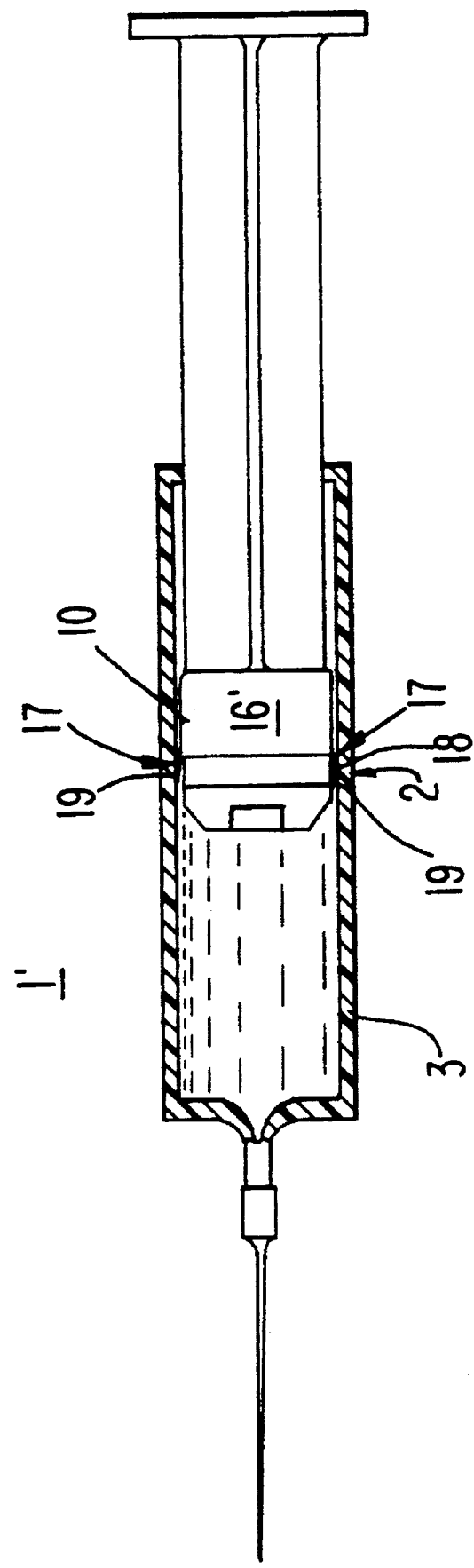

5,577,641

DISPENSING ASSEMBLY COMPRISING A CYLINDRICAL CONTAINER INCLUDING A PISTON

BACKGROUND OF THE INVENTION

1. Field of the Invention

The subject of the present invention is a dispensing assembly having a cylindrical container including a piston.

More particularly, the present invention relates to a dispensing assembly including a container and a dispensing member for dispensing the product contained in the container, the container being cylindrical and including a piston having a body made of rigid material having a cylindrical part carrying a seal made of elastic material.

2. Description of Related Art

In general, up to now, the piston includes a body made of rigid molded plastic, a part of which, of circular cross section, has, at the periphery, a lip molded as one piece with the body of the piston and located axially in the vicinity of a groove in which an O-ring seal is placed.

Such a piston has the drawbacks, on the one hand, of not providing foolproof sealing, by the construction, and, especially in the case where the product to be dispensed has a low viscosity and, on the other hand, of a high production cost, in particular when it is manufactured on a large scale, these drawbacks being explained in more detail in the description which follows. Especially when dispensing products liable to be degraded in contact with the ambient air, such as a hair dye, virtually perfect sealing is required, in particular in the case where this piston is propelled by a gas under pressure, such as compressed air.

Attempts have already been made to produce a piston seal economically. U.S. Pat. No. 4,027,810 describes a sealed cartridge plunger piston for grouting and caulking, the seal of which is arranged so as to provide perfect sealing throughout the duration of long storage of the cartridge, the products that it contains being sensitive to air and to moisture, and this is achieved taking into account the phenomena of thermal contraction and expansion. As a result, the seal is complicated to mold as are the anchoring means necessary for fastening the seal to the body of the plunger piston, and this seal in use serves only for the time to consume the product contained in the cartridge, the latter being subsequently thrown away. GB Reference No. 2,192,577 describes a gutter connector equipped with a seal; the connector and the seal are made of chemically compatible molded plastics making it possible, by the in-situ overmolding of the seal on the connector, to fasten the seal and to avoid having to provide means for holding the seal in place when fitting the gutter and, as a result, to decrease the fitting cost. It should be pointed out that, on the one hand, such a seal is a static seal and that, on the other hand, provision is made in the document to assist, if necessary, the fastening of the seal by a chemical route with a mechanical fastening, for example by molding dovetails.

SUMMARY OF THE INVENTION

The present invention is based on the observation made by the inventors that, surprisingly, a movable piston equipped with an in-situ overmolded seal, the piston and seal being made of chemically compatible substances, was entirely satisfactory as long as the seal had at least one semi-toric portion, ensuring that the piston is sealed and can slide in both directions, and can thus be used for many product-dispensing operations.

Thus, according to the invention, a dispensing assembly, including a container and a dispensing member for dispensing the product contained in the container, the container being cylindrical and including a piston having a body made of rigid material and having a cylindrical part carrying a seal made of elastic material, includes a seal obtained by overmolding the body of the piston made of rigid material, the elastic material and the rigid material being chemically compatible in order to ensure that the seal and the body of the piston are bonded together, the seal having at least one semi-toric portion.

Advantageously, the seal has a sealing lip; the seal has at least two semi-toric portions.

According to a preferred embodiment of the invention, the seal is placed right at an intermediate portion of the body of the piston, but it could be placed at any height on the cylinder; as a variant, the seal is placed right at the edge of the open end of the body of the piston.

Preferably, the seal made of elastic material has a Shore A hardness of between 30 and 120; the pair of rigid and elastic materials is a pair of thermoplastic materials which is chosen from the group formed by the pairs polypropylene-EPDM, polypropylene-polyethylene, polypropylene-styrenics, polypropylene-EPDM/polypropylene copolymer, polyamide-polyethylene, polyester-EPDM, and polystyrene-polyethylene. In the present description and in the claims, the abbreviation EPDM designates an (ethylene/propylene diene, polymethylene) copolymer.

The invention makes it possible to dispense a product having a viscosity of between an approximate value of 1 poise and an approximate value of 70 poise with complete safety, that is to say without any leakage between the piston and the inside wall of the container.

According to one embodiment, the dispensing member is a pump having no air uptake, the bottom of the container including an air-uptake orifice.

As a variant, the dispensing member is a dispensing valve, the piston being pushed by a gaseous propellant under pressure, said propellant being provided in the volume lying between the bottom of the container and the piston. In this variant, the bottom of the container is equipped with a filling system for filling with gaseous propellant: for example, the gaseous propellant is introduced by injection through a plug closing off an orifice located at the bottom of the container.

According to another variant, the dispensing member is the piston itself, which can be manually actuated, the dispensing assembly constituting a syringe.

BRIEF DESCRIPTION OF THE DRAWINGS

In order to make the subject of the invention more understandable, a description will now be given, by way of purely illustrative and nonlimiting example, of an embodiment depicted in the appended drawings.

In these drawings:

FIG. 8 is a side partial cross-sectional view of the piston according to the present invention used in a syringe;

Figure 1:
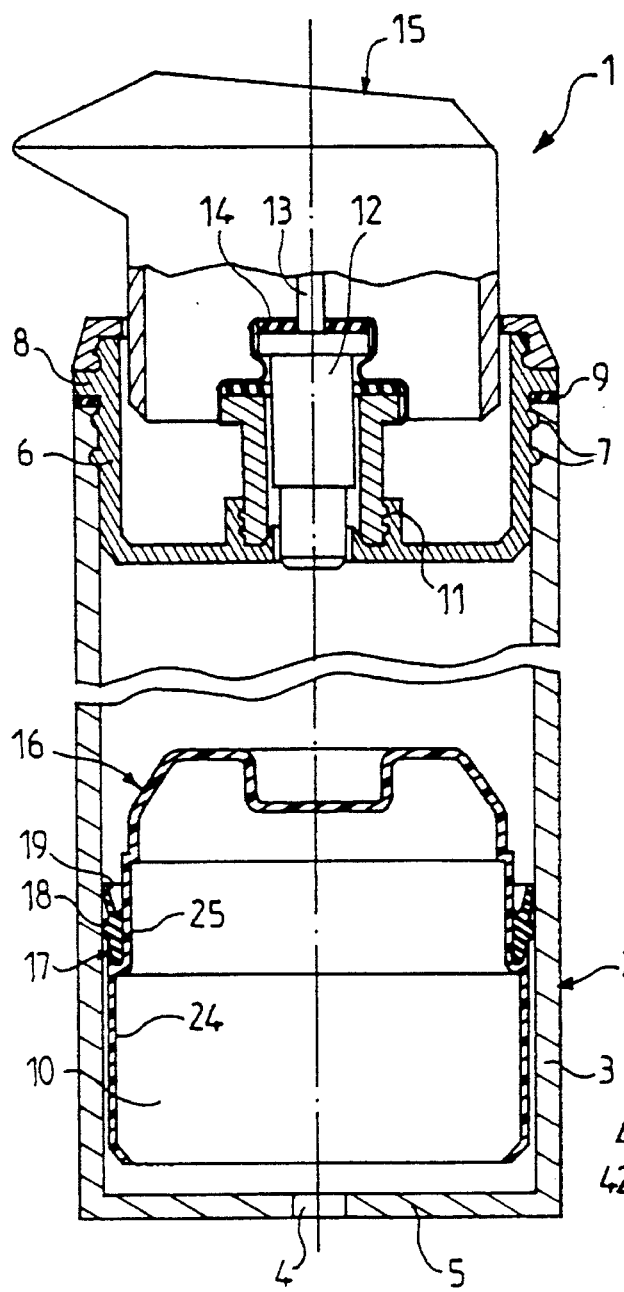
FIG. 1 is a partial sectional view of a dispensing assembly according to the invention.

A dispensing assembly 1 is depicted in FIG. 1 and includes a rigid container 2 made of extruded or injected thermoplastic material having a cylindrical side wall 3; the container 2 includes, inside the wall 3, a follower piston 16 of which a face opposite a product contained in the container 2 is subjected to atmospheric pressure by virtue of the existence of a hole 4 provided in a bottom 5 of the container 2; a spring could be arranged between the bottom 5 and the piston 16.

A base 6 in the form of a cup is snapped into the upper end of the container 2 with the aid of ribs 7 received by conjugate grooves provided on an inside surface of the wall 3; a flange 8 carried by the base 6 sits on the upper end of the wall 3 with a sealing washer 9 therebetween.

A dispensing member, for example a dispensing pump 12 having no air uptake, is supported in a sealed manner by a cup seal 14 crimped onto the upper part of a sleeve and into which it extends; the sleeve is snap-fitted, also in a sealed manner, onto a sheath 11 carried by the bottom of the base 6, in a concavity of said base 6; a dispensing rod 13 of the pump 12 supports an operating member 15 in the form of a push button; such a dispensing assembly is well known per se and will not be described in further detail.

Figure 2:
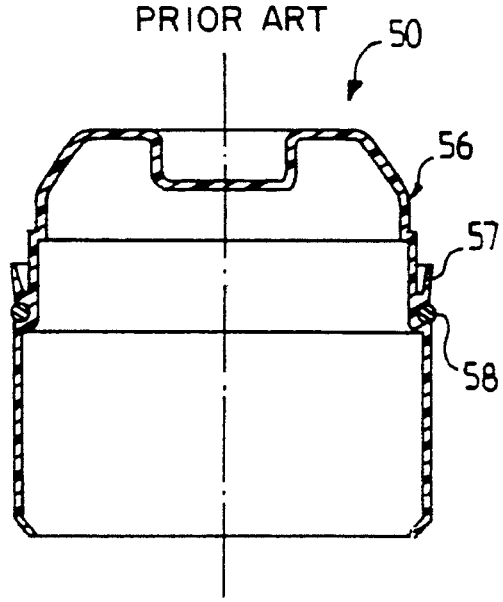
FIG. 2 is a sectional view of a piston of the prior art.

FIG. 2 depicts a piston 50 usually equipping a dispensing assembly of the kind described with regard to FIG. 1; the piston 50 includes a body 56 made of rigid molded plastic, of circular cross section, having, at the periphery, a lip 57 molded as one piece and located axially in the vicinity of a groove in which an O-ring seal 58 is placed. Such a piston 50 has drawbacks: on the one hand, leaks may occur between the seal and the internal wall of the container and/or between the seal and the piston because of the fact that, being fitted so as to roll in the groove of the piston, the seal is not tight fitting in an identical manner over the entire periphery of the groove; and on the other hand, the technology of molding leads to the presence, at the surface of the O-ring seal, of a microflash corresponding to the parting plane of the two jaws of the mold, this microflash being located in the plane of the largest diameter of the torus, or in a plane close to it. This microflash is the source of certain leaks when it is in contact with the internal wall of the container, and when the seal is not tight fitting. Such a piston 50 is furthermore expensive, since not only does the manufacture of the body of the piston require a slide-type mold, the formation of the groove intended to receive the O-ring seal not being able to be obtained otherwise, but also the operation of fitting the O-ring seal into said groove is not cost-free, even when automated.

The piston 16, in accordance with the present invention, does not have these drawbacks.

A body 10 of the piston 16 includes a rigid thermoplastic material and a seal 17 of a flexible material, such as a thermoplastic or an elastomer whose Shore A hardness is of the order of 30 to 120, less than that of the body 10; the body 10 of the piston 16 has a concave shape and its concavity is directed toward the bottom 5 of the container 2 when it is fitted into the latter. The body 10 has, over at least part of its length, corresponding to a lower cylindrical portion 24, an outside diameter equal, to within a fitting clearance, to the inside diameter of the wall 3 of the container 2.

The seal 17 placed right at a cylindrical portion 25 of the body 10 of diameter slightly less than that of the portion 24, has a lip 19 and a semi-toric portion 18 located in the vicinity of the lip 19. The seal 17 is obtained by partially overmolding the body 10, in situ, in a second step, after the actual operation of molding the body 10.

Figure 3:
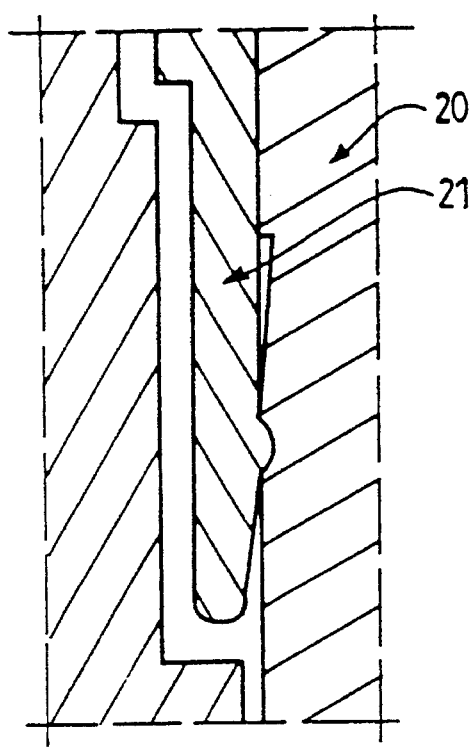
FIGS. 3 to 5 show diagrammatically the molding operations leading to the piston according to the invention.
Figure 4:
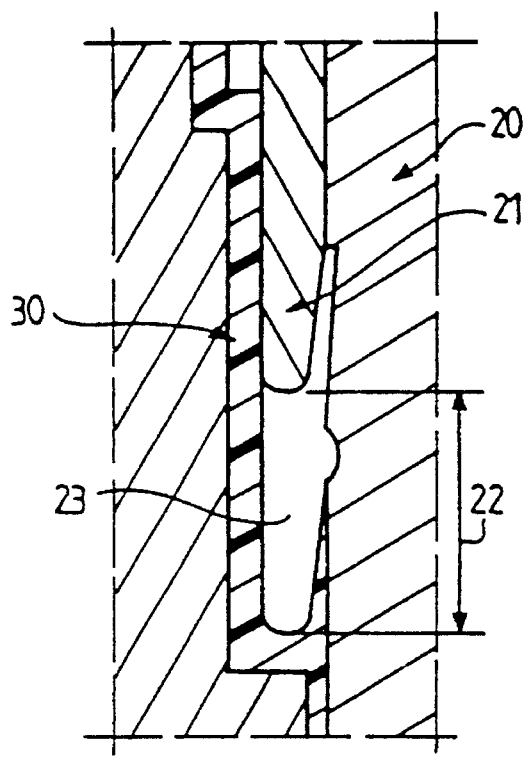
Figure 5:
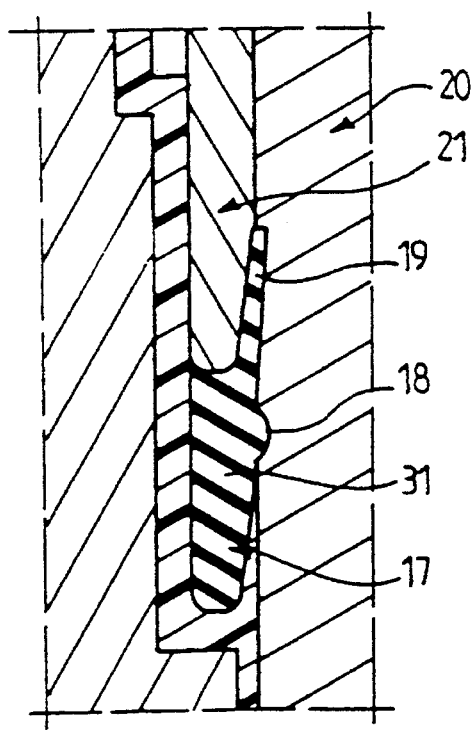

FIGS. 3 to 5 show diagrammatically these various operations: in FIG. 3, the two jaws 20 and 21, having mold cavities, of the mold of the molding machine are closed and ready to receive the rigid material 30 in order to produce the body 10 of the piston 16, and, in a first step, the body 10 is molded. In a second step, as shown in FIG. 4, the jaws 20 and 21 are moved apart, with a clearance 22, thus freeing a volume 23 into which the elastic material 31 is injected, as may be seen in FIG. 5, in order to produce the seal 17 whose lip 19 and semi-toric portion 18 are thus produced at the same time and as a single piece.

It will be noted that this overmolding operation has made it possible not only to produce the seal 17 but also to fit it onto the body 10 of the piston 16 on which it is held in place by reason of the fact that the materials 30 and 31 were provided so as to be chemically compatible in order to ensure cohesion between the two materials, this cohesion being obtained by the formation, during molding, of adhesive bonds by the materials at the interface mixing. As pairs of rigid and elastic materials, pairs composed, for example, of polyolefin, polyester, polystyrene or polyamide, may be taken for the body 10 of the piston 16 and of a mixture of polyolefins or other polyolefins may be taken for the seal 17: these pairs may be, for example, polypropylene-EPDM, polypropylene-polyethylene, polypropylene-styrenics, polypropylene-EPDM/polypropylene copolymer, nylon-polyethylene, etc.

The products commonly dispensed by this type of dispensing assembly, have a viscosity of 10 to 50 poise; it may be an emulsion of oil in water (or of water in oil), the viscosity of which is of the order of 12 poise, a gel, the viscosity of which is of the order of 50 poise, a thickened liquid, the viscosity of which is of the order of 30 poise, or even products of viscosity greater than 50 poise, possibly going up to 70 poise for example. The present invention makes it possible to dispense, with such a type of dispensing assembly, a product of yet lower viscosity, it being even possible to go down below 1 poise: if necessary.

Figure 6:
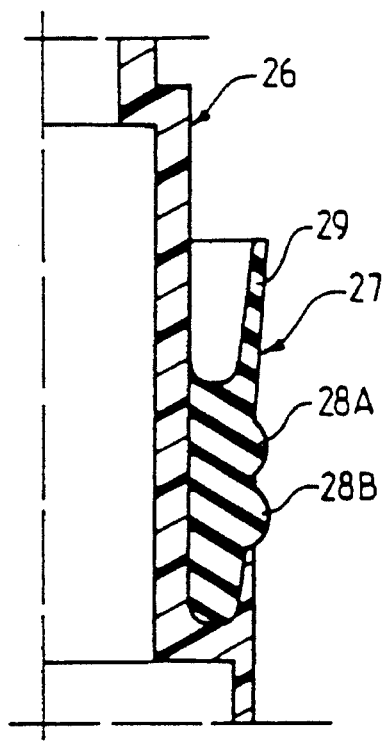
FIG. 6 depicts, partially in section, a variant of a piston according to the invention.

It suffices to provide a seal having two or more semi-toric portions, this being easily achievable and for a lower cost by virtue of the invention. FIG. 6 depicts such as seal 27 integral with the body 26 of the piston, the seal 27 including, in addition to the lip 29, two semi-toric portions 28A, 28B.

Varied products may be dispensed: self-foaming gels, for example shaving gels, depilatory products, beauty-care creams, hair-care products, coloring products, etc. The container 2 has been described as made of extruded or injected thermoplastic material; as a variant, it is made of monobloc aluminum, and the piston has been inserted therein before shaping the neck for fixing the dispensing member.

The dispensing member of the dispensing assembly described with regard to FIG. 1 includes a dispensing pump; of course, the dispensing member could be a dispensing valve and the piston pushed by a gaseous propellant under pressure, said propellant being provided in the volume lying between the bottom of the container and the piston, in which case, the bottom of the container is equipped with a nonreturn valve for filling with gaseous propellant, or with any other known filling system. As shown in FIG. 8, dispensing member could also be constituted by the piston 16' itself which would be manually actuated directly, the dispensing assembly consequently being constituted by a syringe 1'.

Figure 7:
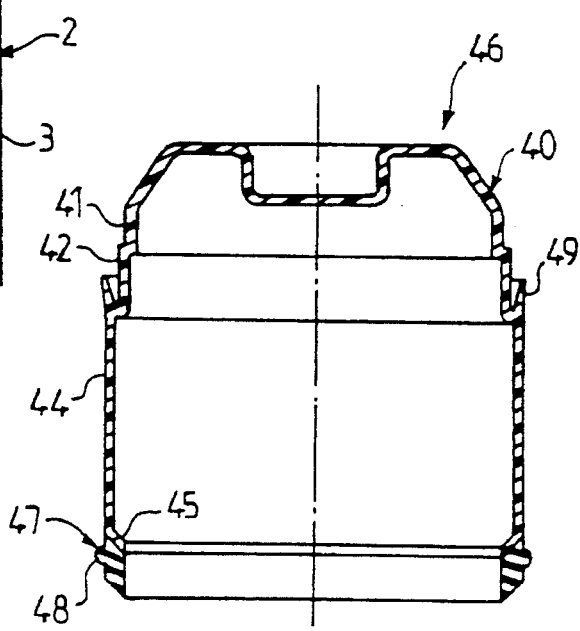
FIG. 7 depicts, in section, another variant of a piston according to the invention.

The method of producing the piston according to the invention and described in relation to the piston 16 variant in FIG. 1 is applicable to the production of the piston 46 variant depicted in FIG. 7; the piston 46 includes a body 40 having a relatively rigid material and a seal 47 with a flexible material obtained by partially overmolding the body 40 in situ. More precisely, according to this variant of FIG. 7, the body 40 of the hollow piston 46 has, in succession, three cylindrical portions 41, 42, 44 of successively increasing diameters, the portion 44 terminating in an edge 45 of frustoconical shape; a lip 49 extends from the junction between the portions 42 and 44, said lip 49 having a cross section decreasing down to its free end and partially surrounding the portion 42. The lip 49 is molded as one piece at the same time as the body 40 of the piston 46 and is similar to the lip 57 described in relation to the piston 50 of FIG. 2. The seal 47 has a cross section, in a plane passing through the longitudinal axis of the piston 46, having the general shape of a parallelogram, as may be seen in FIG. 7, and has a semi-toric portion 48. The seal 47 is secured to the body 40 by the in-situ overmolding of its rim 45. Such a piston 46, of simple construction, has the same advantages as those described in relation to the piston 16 of FIG. 1. The piston 46 is preferably used in a dispensing assembly whose dispensing member is a dispensing valve and whose piston is pushed by a gaseous propellant under pressure, which pressure advantageously presses the seal 47, placed at the open end of the piston 46, against the inside wall of the container 2; however, excellent results were also obtained by using the piston 46 in a dispensing assembly whose dispensing member is a dispensing pump, as described in relation to FIG. 1. Advantageously, the body 40 of the piston 46 is made of polypropylene and the seal 47 is made of EPDM/polypropylene copolymer.

We claim:

1. Dispensing assembly, comprising:

a container for a product, said container having a cylindrical portion; and a dispensing member for dispensing the product, wherein a piston is movably mounted in the cylindrical portion of the container, has a body made of a rigid material, has a cylindrical part corresponding to the cylindrical portion of the cylinder, and carries a seal extending between the cylindrical portion of the container and the cylindrical part of the piston, wherein said seal is made of an elastic material overmolded on the body of the piston and has at least one semitoric portion formed as one piece with the seal, wherein the elastic material of the seal and the rigid material of the piston are chemically compatible and bind the seal to the body of the piston, thereby non-movably fixing the seal relative to the piston, and wherein the seal has a sealing lip, to provide a seal between the container and the piston, said seal and lip being formed as one piece.

2. Dispensing assembly according to claim 1, wherein the seal has two semi-toric portions formed as one piece with the seal.

3. Dispensing assembly according to claim 1, wherein the seal is placed at an intermediate portion of the body of the piston.

4. Dispensing assembly according to claim 1, wherein the seal is placed at an edge of an open end of the body of the piston.

5. Dispensing assembly according to claim 1, wherein the seal has a Shore A hardness of between 30 and 120.

6. Dispensing assembly according to claim 1, wherein the rigid material and the elastic material are thermoplastic materials comprising the pairs polypropylene-EPDM, polypropylene-polyethylene, polypropylene-styrenics, polypropylene-EPDM/polypropylene copolymer, polyamide-polyethylene, polyester-EPDM, or polystyrene-polyethylene.

7. Dispensing assembly according to claim 1, wherein the product to be dispensed has a viscosity of between an approximate value of 1 poise and an approximate value of 70 poise.

8. Dispensing assembly according to claim 1, wherein the dispensing member is a pump having no air uptake and, the container includes a bottom with an orifice.

9. Dispensing assembly according to claim 1, wherein the dispensing member is a dispensing valve, the piston being pushed by a gaseous propellant under pressure, said propellant being provided in a volume lying between a bottom of the container and the piston.

10. Dispensing assembly according to claim 9, wherein the container is equipped with a filling system for filling with gaseous propellant.

11. Dispensing assembly according to claim 1, wherein the dispensing member is the piston which is manually actuated, the dispensing assembly being a syringe.

* * * * *